June 29, 1926.
F. W. SEYMOUR ET AL
1,590,590
COMBINED WATER SYSTEM SERVICE PROTECTOR AND ELECTRICAL GROUND
Filed Dec. 11, 1923
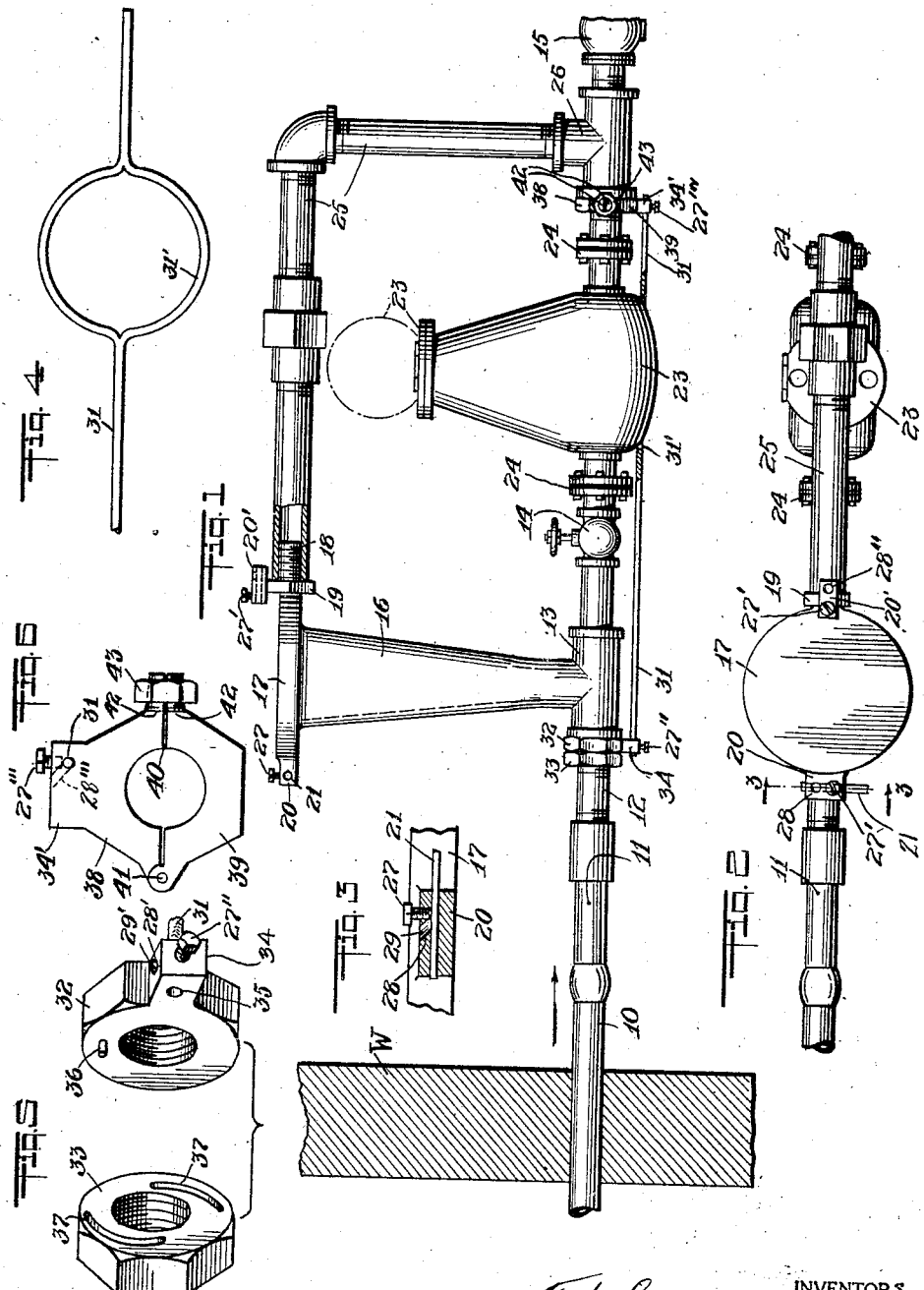
INVENTORS
F. W. Seymour & D. A. Sillen
BY
Geo. L. Beeler
ATTORNEY Patented June 29, 1926.

1,590,590

UNITED STATES PATENT OFFICE.

FREDERICK W. SEYMOUR AND DANIEL A. GILLEN, OF FLUSHING, NEW YORK.

COMBINED WATER SYSTEM SERVICE PROTECTOR AND ELECTRICAL GROUND.

Application filed December 11, 1923. Serial No. 680,055.

This invention relates to electrical and water or gas supply systems for buildings and has special reference to the use of improved means for utilizing the water or gas supply system for grounding electrical circuits or systems.

An electric system of the type referred to is usually grounded through the water supply system, and the present method of attaching or effecting the grounding of the electric wires is by means of clamps soldered to the wires and then pressed or wrapped around the water pipes on the service side of the water cock or meter, the clamps after wrapping around the pipes being drawn tight by means of a screw or stove bolt and nut. This method affords only a pressed contact which we from our extensive experience in installation and inspection of such systems have found to be weak and defective from the standpoint of conductivity of electricity and hence reliability, because of the coatings formed or accumulated upon the surface of the pipes due to oxidation, dirt, and tendency to looseness due to deterioration, stretching of the parts, and other deteriorating conditions. Again, most of the regulations and rules bearing upon the grounding of electrical systems require that the secondary service wire and conduit ground be soldered or otherwise suitably connected to the ground wire run or connected to the service side of the water cock where the connection is effected by a ground clamp of the character above mentioned. When, however, the water system enters the building at a great distance from the point of entry of the electrical system the grounding is commonly effected by connecting the electric conduit or armored cable to the nearest water pipe, it being remote from the meter and service side of the water system makes it mandatory or desirable that a shunt for the electrical system be made around the water meter. Among other reasons for this shunt is that the meter is connected between the main water pipes by means including washers or couplings of insulation. Hence to carry out the usual program other ground clamps pressed or wrapped around the pipes and soldered to the wires are usually employed.

Another common and objectionable condition commonly met with is the fact that the water meter, being placed within two or three feet of the foundation or wall of the cellar, is subjected to frequent damage due to heavy weights being piled or permitted to fall upon it, tending to break the glass or the more delicate working parts of the instrument. Among the objects of the invention, therefore, is to provide mechanical protection for the water meter, said protecting means consisting of a strong structure such as rigid pipes or rods bridging or guarding the meter and having positive metallic connection with the water pipes on opposite sides of the meter insulation.

Another fault with water systems as commonly practiced is that there is a pronounced hammering or pounding within the pipes resulting from sudden closing of the faucets, especially automatic closing faucets such as are frequently used in public buildings especially, and such hammering is an incident or accompaniment of added pressure in the water system, such pressure having a tendency to produce undesirable conditions such as leaky faucets, valves, or other fittings, as well as the causing of other damages. A further object of the invention therefore, is to provide a cushion for the water system to relieve this undue pressure and hammering action and also to utilize the cushion mechanism as a part of the grounding and reinforcing system for the protection of the meter.

Other objects of the invention are to provide an electrical shunt around the water meter and having peculiar and novel connecting means between the wires and the heavier conductor mechanism; to thereby improve the conductivity of the ground connection between the ground wire and the water system pipe; to improve the conductivity of a shunt around the water meter; to provide a combined reinforcement or guard for the water meter and electrical shunt and serving also to sustain the pipe ends in substantially standard position when the meter is removed for any purpose.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a side elevation of a preferred embodiment of the invention.

Fig. 2 is a plan view of the same.

Fig. 3 is a sectional detail on the line 3—3 of Fig. 2.

Fig. 4 is a detail plan view of a meter connector or hanger.

Fig. 5 is a detail view of a double lock nut and connector.

Fig. 6 is a detail view of another form of connector.

Referring now more specifically to the drawings we show a water service pipe 10 leading inward through a wall W and having any suitable type of connection at 11 with the next section of the pipe 12 to or in which is fitted a T 13. Beyond this T or otherwise suitably located is a cut off valve 14, and at any suitable place may be located a check valve 15.

Integral with and supported by the T 13 is a dome 16 providing an air pocket or cushion within it and having a substantially flat closed top 17 having formed at any suitable place a threaded extension 18 on which is a lock nut 19, and formed at another convenient place with a lug 20 having a hole formed therethrough for the passage or attachment of a ground wire 21.

23 indicates a meter sandwiched between the main water pipe and having insulated couplings 24 securing it in place as is above premised with the meter so connected and insulated for its own protection from electrical damage.

In case a ground connection from a remote electrical system is made with an adjacent water pipe in the building remote from the service end of the pipe, it is essential that a shunt be formed around the meter. To this end we provide a positive metallic connection as indicated by a system of piping or rods 25 shown as connected at one end to the extension 18 of the cushion dome and at the other end to a T-coupling 26 on the other side of the meter from the cushion. It will be noted also that this rigid frame or guard structure 25 is brought over the top of the meter and spaced sufficiently above it to not obstruct the reading of the meter nor the opening of its cover, but in position to effectively guard the meter from mechanical or physical damage. One end of the guard is shown threaded upon the extension 18 and after such connection is made the nut 19 is tightened snugly up against it. This nut is shown provided with a lug 20' of the same character as the lug 20.

The preferred means for attaching the ground wire or shunt wire to the conductor portion of the water system comprises the threading of the wire into or through the hole in the lug 20 and tightening firmly down upon it a set screw 27, and to make the connection doubly electrically secure we provide a pit 28 in the upper portion of the lug 20 adjacent to the screw, said pit communicating with the wire hole, and this pit is run full of molten metal 29 making a substantially integral connection or contact between the wire and the body of the lug. The same means for attaching the wire may be employed at the lug 20' formed on and constituting a part of the lock nut 19 or it may be located at any other desired place in the system. The molten metal or solder if poured into a pit 28 as shown so inclined or shaped as to communicate with both the screw hole and the wire hole, will seal or solder the screw from turning as well as making an integral connection for the wire.

The hanger shown best in Fig. 4 comprises a rod structure 31 having substantially straight ends between which is located a circular or elliptical branch portion 31' forming a seat for the bottom of the meter to assist in supporting or stabilizing the meter. The ends of the hanger are connected on opposite sides of the meter and insulation to the piping and the means we prefer to employ for this purpose is as shown in Figs. 1, 5, and 6, the same comprising for one end of the hanger a pair of lock nuts 32 and 33, the former being shown provided with a lug extension 34 having a hole 35 passing therethrough for the end of the hanger parallel to the axis of the pipe on which the nut is placed and having a pit 28' for solder 29' and also a set screw 27" as already described. This projection 34 may extend downward or laterally as may be best suited for any particular installation. The nut 32 carries a strong pin 36 co-operating with one of several grooves 37 formed in the adjacent face of the companion nut 33. The pin 36 is parallel to the axis of the pipe and is spaced radially therefrom to a distance about midway between the ends of the groove which is shown arranged spirally in the face of the nut 33. In applying the nuts to the pipe they are assembled so that the pin lies easily within one of the grooves and while the nuts are turned together for positioning them either against or with respect to the T-coupling 13 there is no relative movement between the pin and its groove. However, after the nut 32 is fixed in position either by jamming it against the end of the T or otherwise, the nut 33 is given an independent binding rotation for locking it and the other nut, and this independent rotation of the nuts causes the pin to increase the grip or holding power of the nuts by riding up toward one end or the other of the cam groove. For the other end of the hanger we show a special form of combination gripping lock nut and connector, the same comprising a two part structure 38 and 39 open at one side at 40 and hinged at 41 at the opposite sides for passing around a pipe that may already have been installed. The two parts of the nut are threaded as usual for co-operation with companion extensions 42 externally threaded for receiving a binding nut 43. These extensions are preferably tapered so as to admit the nut thereon and with sufficient space at 40 between the extensions to tighten the nut and so cause the divided nut to grip with great power upon the pipe for locking it in place. The member 38 is provided with an extension 34' having provision for the end of the hanger 31 or other connection and having also a set screw 27''' and pit 28''' for the solder running to both the connection and the screw.

The details of construction just referred to are designed to meet the condition that public service corporations are required to ground the secondary service wires. The neutral wire of a three wire system or one wire of a two wire system therefore are often grounded inside a building. Where this is done by the corporation the electrician who wires the building usually grounds the conduit or armored cable separately. To provide for the two ground wires we employ the dome and flange or lug extension for one ground already described and a lock nut combination electrical connector threaded to the dome for the second ground, or if desired the connection may be made through the hanger as just described. As regards the latter condition it will be observed that contact between the meter and the hanger does not throw the main body of the meter into the electrical circuit, the resistance of the meter being much higher than that of the hanger, but the meter may carry some current. The amount of current so passing through the meter would be so small that it could not damage the instrument. In this regard it will be noted likewise that the cross sectional area of the hanger and consequently the electrical conductance thereof is increased at the meter by the branch construction thereof.

In the event that the plumber doing the piping and setting up of the meter and the electrician connecting the ground wires were not working together or at the same time, the condition arises where the piping will be installed without the necessary lock nut being provided for attaching the meter base shunt or hanger 31, in which case the electrician would object or would not be permitted to take down the piping to apply the necessary connections. We, therefore, have provided a combination lock nut or connector in two sections as shown in Fig. 6 which may be applied over any suitably sized pipe by opening and swinging one part on its hinge around the other and then thereafter applying the binding nut 43 as already set forth.

We claim:

In a combined system as set forth, the combination with a water service pipe, a member coupled therein, and a dome extending upward from the pipe and constituting an air cushion for the water circulating system, of means including a lug integral with the dome for attaching with a substantially integral connection an electric ground wire to the top of the dome, and rigid mechanical guard means and electrical conductor connected to the top of the dome and extending thence around said coupled member.

In testimony whereof we affix our signatures.

FREDERICK W. SEYMOUR.
DANIEL A. GILLEN.